United States Patent [19]

Svab

[11] Patent Number: 4,760,757
[45] Date of Patent: Aug. 2, 1988

[54] CONTINUOUSLY VARIABLE BELT DRIVEN TRANSMISSION FOR MOTOR VEHICLES WITH A COMPACT PLANETARY GEARING AND CLUTCH AND BRAKE ASSEMBLY

[75] Inventor: Eugen Svab, Cologne, Fed. Rep. of Germany

[73] Assignee: Ford Motor Company, Dearborn, Mich.

[21] Appl. No.: 6,519

[22] Filed: Jan. 23, 1987

[30] Foreign Application Priority Data

May 2, 1986 [DE] Fed. Rep. of Germany ....... 3603401

[51] Int. Cl.⁴ ............................................. F16H 37/00
[52] U.S. Cl. ........................................ 74/689; 74/740; 192/85 AA; 192/3.52
[58] Field of Search ................. 74/740, 689; 192/3.52, 192/85 AA

[56] References Cited

U.S. PATENT DOCUMENTS

| | | | |
|---|---|---|---|
| 2,583,919 | 1/1952 | Wilson | 192/85 AA |
| 2,825,236 | 3/1958 | Nabstedt et al. | 192/85 AA X |
| 3,319,491 | 5/1967 | Simpson | 192/3.52 X |
| 4,526,061 | 7/1985 | Sakakibara et al. | 74/689 |
| 4,543,852 | 10/1985 | Svab et al. | 74/740 |
| 4,583,423 | 4/1986 | Hahne | 74/689 |
| 4,608,885 | 9/1986 | Koivunen | 74/689 |

FOREIGN PATENT DOCUMENTS

| | | |
|---|---|---|
| 1126212 | 9/1962 | Fed. Rep. of Germany . |
| 3241789 | 8/1985 | Fed. Rep. of Germany . |
| 3538884 | 10/1985 | Fed. Rep. of Germany . |
| 952474 | 3/1964 | United Kingdom ............... 192/3.52 |

*Primary Examiner*—Dirk Wright
*Attorney, Agent, or Firm*—Donald J. Harrington; Keith L. Zerschling

[57] ABSTRACT

An infinitely variable transmission for a motor vehicle comprising a belt and sheave assembly, a two speed planetary gear unit between the vehicle engine and the input sheave of the sheave assembly, a fluid pressure supply pump on the side of said input sheave remote from said planetary gear unit, a pump drive shaft extending from the pump through the input sleeve to the input carrier of said planetary gear unit, a direct drive pressure operated clutch for said planetary gear unit located between said planetary gear unit and said input sheave, and passages in the planetary carrier of said planetary gear unit for distributing fluid pressure from a supply passage in said drive shaft to the direct drive clutch.

3 Claims, 2 Drawing Sheets

CONTINUOUSLY VARIABLE BELT DRIVEN TRANSMISSION FOR MOTOR VEHICLES WITH A COMPACT PLANETARY GEARING AND CLUTCH AND BRAKE ASSEMBLY

BACKGROUND OF THE INVENTION

The invention relates to a planetary transmission with a continuously variable belt drive.

An example of prior art relating to the planetary gear portion of the invention is described in German Pat. No. 11 26 212. The carrier assembly of the planetary gearing of that reference comprises two sets of planet pinions that mesh with one another and form the input member. The sun gear forms the output member and the ring gear forms the reaction member. Reverse drive can be effected by locking the ring gear by means of a friction disc brake. Forward drive can be effected by connecting the carrier assembly to the sun gear by means of a friction disc clutch. The friction disc clutch and brake can be actuated hydraulically by means of piston-cylinder units.

The axial structural length of the transmission of the prior art reference is too long for many applications and the ring gear is not guided and supported against axial movement.

Another example of related prior art is shown in German Pat. No. 32 41 789. That reference describes a transmission having friction disc clutches constructed in the form of multiple-disc assemblies. The forward drive clutch, which connects the planetary carrier to the sun gear, must be supplied with pressure fluid for the associated piston-cylinder unit in a complicated flow path through radial bores in different hollow shafts. Here too the structural length of the transmission is undesirably long and the supply of lubricating oil to the planetary gearing is difficult.

A third example of related prior art is described in German Patent Application P No. 35 38 884.6, which describes a so-called torque sensor disposed in the region of the forward drive clutch. As a result, an additional sleeve member, by way of which the pressure fluid for the forward drive clutch is supplied by way of radial bores, is added to the hollow shafts already present. In this case axial cavities used for distributing the pressure fluid must be sealed off by corresponding sealing rings. These adversely affect the sensitivity of the torque sensor on account of their friction.

SUMMARY OF THE INVENTION

The invention relates to improvements in planetary transmissions, in particular a continuously variable belt drive transmission with planetary gearing for motor vehicles. Provision is made for supplying pressure fluid to the forward drive clutch and for supplying lubricating oil to the planetary gear sets and the friction clutches with reduced space being required.

The pressure fluid is supplied to the piston-cylinder unit of the forward drive clutch by way of a passage which extends through the hollow pump drive shaft. The pressure acts upon a central bore in the planetary carrier. The central bore is connected by way of radial bores in the front planet carrier flange and by way of axial bores in support webs extending axially between the planet pinions to a space adjacent the cylinder. That space is connected by way of a duct to the pressure chamber of the forward drive clutch. A supply of pressure fluid to the forward drive clutch thus is provided whereby radial duct arrangements crossing hollow shafts are avoided.

By virtue of the fact that the axially extending support webs have a generally trapezoid cross-section, they can be provided in their narrow areas with bores for fastening pins for a rear planetary carrier ring and in their wide areas with two axial bores, one of which is used for supplying pressure fluid to the forward drive clutch and the other of which is used for supplying lubricant to the friction discs.

The needle bearings of the planet pinion can be supplied with lubricating oil by way of blind-end bores and a radial bore in each planet pinion pin. Lubricating oil can also flow radially outward and act upon the thrust washers that axially guide the ring gear. The thrust washers axially guiding the ring gear are centered and supported on the thrust washers of the planet pinions.

BRIEF DESCRIPTION OF THE FIGURES OF THE DRAWINGS

The invention is described in greater detail with reference to an embodiment illustrated in the drawings in which.

PARTICULAR DESCRIPTION OF THE INVENTION

Figure 1:
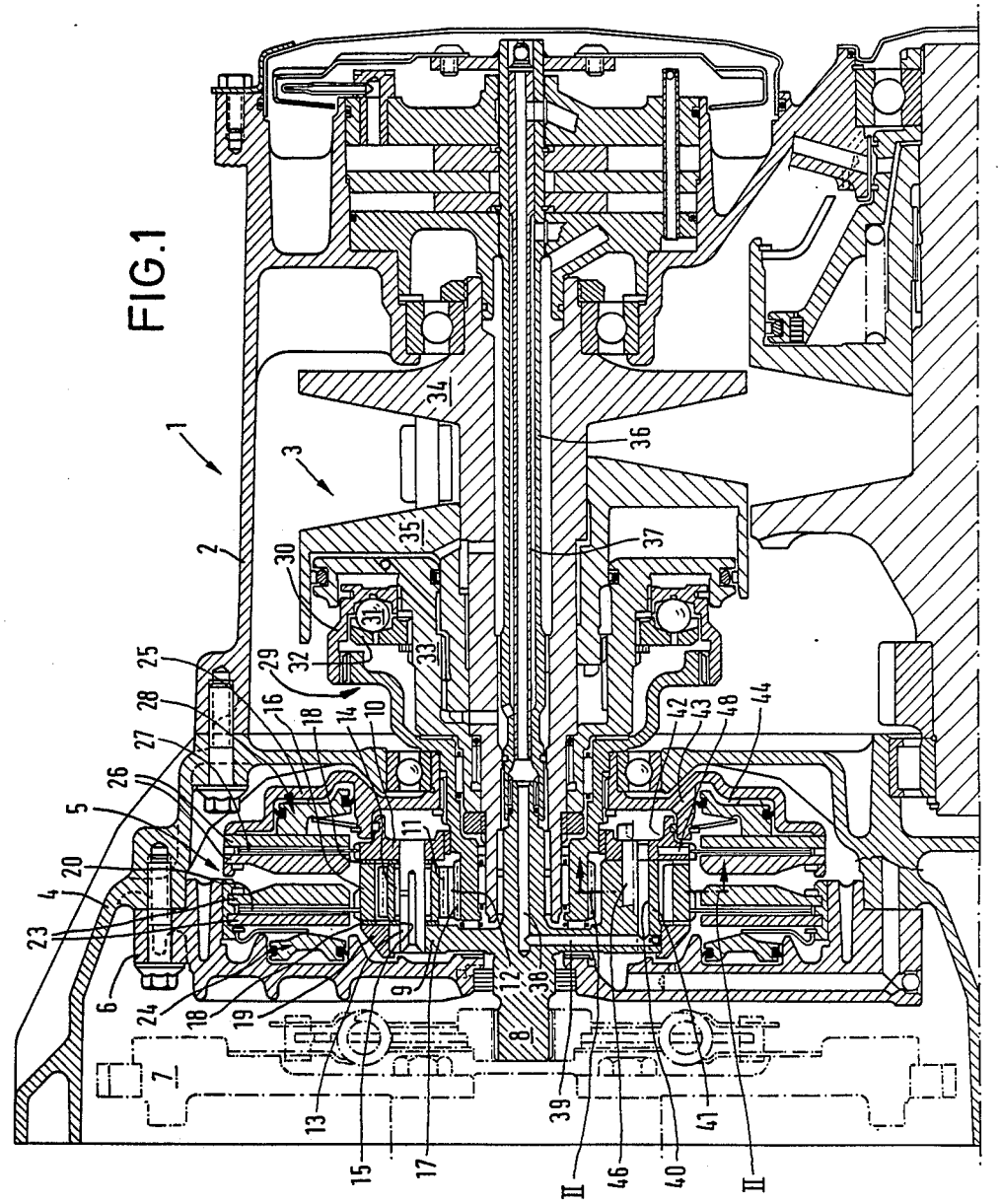
FIG. 1 is a vertical partial section through a planetary transmission, in particular a continuously variable, belt drive, planetary transmission for motor vehicles.

In gearbox casing 1, the continuously variable belt-drive transmission 3 is disposed in one casing portion 2, while the planetary gearing 5 and the corresponding friction disc clutch and brake assemblies are disposed in connecting casing portion 4. The planetary gearing 5 is separated by a cover plate 6 from flywheel and damper assembly 7 connected to the crankshaft of an internal combustion engine.

Flywheel and damper assembly 7 drives the flange 9 of planetary carrier 8, which forms the input member of the transmission. The planetary carrier 8 comprises, in addition to front carrier flange 9, a rear planet carrier ring 10.

Two mutually meshing sets of planet pinions 11 and 12 are rotatably mounted in the planet carrier 8 by means of planet pins 13 and needle bearings 14. The pinions axially guided by means of thrust washers, one set 11 of pinions meshing with ring gear 16 and the other set 12 planet pinions meshing with sun gear 17.

The ring gear 16 is guided axially between the carrier ring 10 and a carrier closure member 19 by means of thrust washers 18. It is connected driveably to friction disc 20 by means of external teeth.

The thrust washers 18 axially guiding the ring gear 16 are radially centered and prevented from rotating by means of the thrust washers 15 for the planet pinions 11 and 12. Thrust washers 18 are formed with internal projections 22 having a suitable concave portion 21 that registers with the convex portions of thrust washers 15.

Clutch thrust plates 23 are held rotationally rigidly in the cover plate 6 by means of teeth. Plates 23 are acted upon by piston-cylinder unit 24.

The friction disc 20, together with the clutch thrust plates 23 and the piston-cylinder unit 24, form a so-called reverse drive clutch assembly by means of which the ring gear 16 can be locked as a reaction member.

A cylinder component 25, on which clutch thrust plates 26 are secured by radial teeth, is connected rotationally rigidly to the sun gear 17. The clutch thrust plates 26 receive between them a friction disc 27, which is connected driveably to the planet carrier ring 10 by means of spline teeth. The clutch thrust plates 26 are acted upon by piston-cylinder unit 28.

The clutch thrust plates 26, together with the friction disc 27 and the piston-cylinder unit 28, form a so-called forward drive clutch assembly by means of which relative rotation between the sun gear 17 and the planet carrier 8 is prevented. Forward driving torque thus is transmitted from the planet carrier directly to the sun gear 17.

The sun gear 17 forms a driving collar 29 for the input member 30 of a torque sensor which acts by means of balls 31 upon an output member 32. Sleeve member 33 is connected by spline teeth to member 32, which is connected driveably both to the stationary cone pulley part 34 and to the movable cone pulley part 35 of the primary short.

Further details and the mode of operation of the torque sensor are not explained here, since they are not the subject of the invention.

According to the invention the pressure fluid is supplied to the forward gear clutch by way of a supply pipe 37, which extends through the hollow pump drive shaft 36 and communicates with a central bore 38 in the planetary carrier 8. The pressure fluid is passed from this central bore 38 through radial bores 39 in the front carrier flange 9 to a radially outward location. From there it passes through axial bores 40 in support webs 41 extending axially between the sets 11 and 12 of planet pinion in a space 42, which is adjacent the cylinder component 24 and connected by means of a duct 43 to the pressure space 44 of the piston-cylinder unit 20 of the forward drive clutch assembly.

Figure 2:
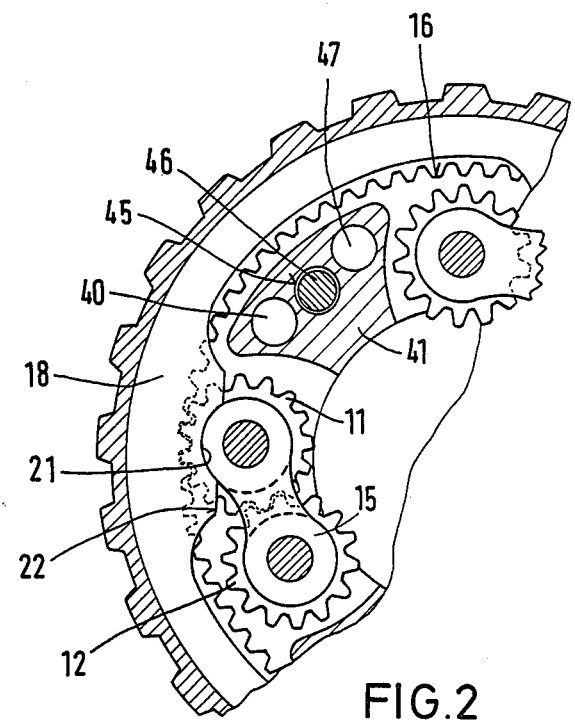
FIG. 2 is a partial section along the line II—II in FIG. 1.

The axially extending support webs 41 have a trapezoid cross-section as seen in FIG. 2. They are provided in their central area with bores 45 for fastening pins 46 for the rear planet carrier ring 10. In adjacent areas two axial bores 40 and 47 are provided, of which one bore 40 provides for the supply of pressure fluid to the forward drive clutch, while the other bore 47 provides for the supply of lubricating oil to the friction discs by way of radial bores 48.

In this way, radial pressure fluid supply lines with their necessary sealing rings, which would adversely affect the sensitivity of the torque sensor, can be eliminated. Sealing rings otherwise would have to be located in the region of the torque sensor between the sleeve parts that rotate relative to one another.

In addition, a minimum structural length is made possible. This is important in the case of front-wheel drive vehicles.

Furthermore, the main bearing may be moved closer to the cone pulleys, as a result of which a better load distribution and a greater rigidity and quiet running is achieved.

I claim:

1. In an infinitely variable belt and pulley drive for an engine powered vehicle;
    an engine driven input memer and an output pulley adapted to be connected to a driven member;
    a variable pitch driving pulley mounted for rotation on an axis parallel to the axis of said driven member, said driving and output pulleys being adapted to be connected driveably by a drive belt;
    a simple planetary gear unit mounted coaxially with respect to said driving pulley between said input member and one side of said driving pulley, said planetary gear unit comprising a sun gear adapted to be connected to said driving pulley, a ring gear and a planetary carrier with pinions connected to said input member;
    brake means for selectively braking said ring gear and clutch means for selectively connecting two elements of said planetary gear to establish a driving ratio of unity therein;
    a pressure supply pump adjacent the other side of said driving pulley and coaxial therewith;
    a pump drive shaft extending through said driving pulley and connecting said input member with said pump;
    a clutch servo for engaging said clutch means comprising an annular cylinder connected to said sun gear and an annular piston in said cylinder defining an annular clutch pressure chamber;
    said planetary gear unit being located radially inward and generally in the radial plane of said clutch and servo thereby forming a gear unit and clutch servo assembly of minimal axial dimension;
    a fluid pressure supply passage in said pump drive shaft, a pressure passage in said carrier communicating with said supply passage, a radial pressure passage extending through said carrier on the side of said planetary gear unit remote from said driving pulley and an axially extending passage extending through said carrier between said pinions not communicating with said clutch pressure chamber.

2. In an infinitely varaible belt and pulley drive for an engine powered vehicle;
    an engine driven input member and an output pulley adapted to be connected to a driven member;
    a variable pitch driving pulley mounted for rotation on an axis parallel to the axis of said driven member, said driving and output pulleys being adapted to be connected driveably by a drive belt;
    a simple planetary gear unit mounted coaxially with respect to said driving pulley between said input member and one side of said driving pulley, said planetary gear unit comprising a sun gear adapted to be connected to said driving pulley, a ring gear and a planetary carrier with pinions connected to said input member;
    brake means for selectively braking said ring gear and clutch means for selectively connecting two elements of said planetary gear to establish a driving ratio of unity therein;
    said planetary gear unit being located radially inward of said clutch means and said brake means thereby forming a gear and a clutch and brake means assembly of minimal axial dimensions, said planetary gear unit and said clutch and brake means being located generally on a common radial plane;
    a pressure supply pump adjacent the other side of said driving pulley and coaxial therewith;
    a pump drive shaft extending through said driving pulley and connecting said input member with said pump;
    a clutch servo for engaging said clutch means comprising an annular cylinder connected to said sun gear and an annular piston in said cylinder defining an annular clutch pressure chamber;
    a fluid pressure supply passage in said pump drive shaft, a pressure passage in said carrier communicating with said supply passage, a radial pressure passage extending through said carrier on the side of said planetary gear unit remote from said driving pulley and an axially extending passage extending through said carrier between said pinions not communicating with said clutch pressure chamber, a lubrication oil pressure passage in said carrier extending axially and communicating with said radial passage and a lubrication passage extending from said clutch means to said axially extending lubrication oil passage.

3. The combination as set forth in claim 1 wherein said radial passage in said carrier communicates through said carrier with said remote side of said carrier, and a radial passage extending from said clutch pressure chamber to said remote side whereby said clutch is applied when said supply passage is pressurized.

* * * * *